US008013041B2

(12) United States Patent
Solhage

(10) Patent No.: US 8,013,041 B2
(45) Date of Patent: Sep. 6, 2011

(54) CELLULOSIC PRODUCT

(75) Inventor: Fredrik Solhage, Borås (SE)

(73) Assignee: Akzo Nobel N.V., Arnhem (NL)

( * ) Notice: Subject to any disclaimer, the term of this patent is extended or adjusted under 35 U.S.C. 154(b) by 0 days.

(21) Appl. No.: 12/516,975

(22) PCT Filed: Nov. 29, 2007

(86) PCT No.: PCT/SE2007/050922
§ 371 (c)(1),
(2), (4) Date: Jul. 15, 2009

(87) PCT Pub. No.: WO2008/066488
PCT Pub. Date: Jun. 5, 2008

(65) Prior Publication Data
US 2010/0048768 A1 Feb. 25, 2010

Related U.S. Application Data

(60) Provisional application No. 60/872,346, filed on Dec. 1, 2006, provisional application No. 60/931,125, filed on May 21, 2007.

(30) Foreign Application Priority Data

Dec. 1, 2006 (EP) ..................... 06125240
May 21, 2007 (EP) ..................... 07108545

(51) Int. Cl.
C08L 1/00 (2006.01)
C08L 33/00 (2006.01)
(52) U.S. Cl. .......................... 524/35; 524/522
(58) Field of Classification Search ...... 524/35
See application file for complete search history.

(56) References Cited

U.S. PATENT DOCUMENTS

| 3,556,934 A | 1/1971 | Meyer |
| 3,615,972 A | 10/1971 | Morehouse, Jr. et al. |
| 3,945,956 A | 3/1976 | Garner |
| 4,133,688 A | 1/1979 | Sack |
| 4,287,308 A | 9/1981 | Nakayama et al. |
| 4,388,150 A | 6/1983 | Sunden et al. |
| 4,753,710 A | 6/1988 | Langley et al. |
| 4,927,498 A | 5/1990 | Rushmere |
| 4,954,220 A | 9/1990 | Rushmere |
| 4,961,825 A | 10/1990 | Andersson et al. |
| 4,980,025 A | 12/1990 | Andersson et al. |
| 5,071,512 A | 12/1991 | Bixler et al. |
| 5,125,996 A | 6/1992 | Campbell et al. |
| 5,127,994 A | 7/1992 | Johansson |
| 5,176,891 A | 1/1993 | Rushmere |
| 5,368,833 A | 11/1994 | Johansson et al. |
| 5,447,604 A | 9/1995 | Johansson et al. |
| 5,470,435 A | 11/1995 | Rushmere et al. |
| 5,536,756 A | 7/1996 | Kida et al. |
| 5,543,014 A | 8/1996 | Rushmere et al. |
| 5,571,494 A | 11/1996 | Saastamoinen |
| 5,573,674 A | 11/1996 | Lind et al. |
| 5,584,966 A | 12/1996 | Moffett |
| 5,603,805 A | 2/1997 | Andersson et al. |
| 5,607,552 A | 3/1997 | Andersson et al. |
| 5,688,482 A | 11/1997 | Saastamoinen |
| 5,707,493 A | 1/1998 | Saastamoinen |
| 5,969,011 A | 10/1999 | Frölich et al. |
| 6,165,259 A | 12/2000 | Hällström et al. |
| 6,235,394 B1 | 5/2001 | Shimazawa et al. |
| 6,235,800 B1 | 5/2001 | Kyuno et al. |
| 6,306,255 B1 | 10/2001 | Frölich et al. |
| 6,509,384 B2 | 1/2003 | Kron et al. |
| 6,846,384 B2 | 1/2005 | Lindgren et al. |
| 6,918,995 B2 * | 7/2005 | Frolich et al. .............. 162/164.5 |
| 2001/0038893 A1 | 11/2001 | Mohan et al. |
| 2003/0152724 A1 | 8/2003 | Swoboda et al. |
| 2005/0079352 A1 | 4/2005 | Glorioso et al. |

FOREIGN PATENT DOCUMENTS

| EP | 0 102 335 A1 | 3/1984 |
| EP | 0 486 080 A2 | 5/1992 |
| EP | 1 288 272 A1 | 3/2003 |
| JP | 62-286534 A | 12/1987 |
| JP | 2689787 B2 | 8/1997 |
| JP | 2002-254532 A | 9/2002 |
| JP | 2003-105693 A | 4/2003 |
| JP | 2005-213379 A | 8/2005 |
| JP | 2005-272633 A | 10/2005 |
| WO | WO 01/54988 A2 | 8/2001 |
| WO | WO 02/12626 A1 | 2/2002 |
| WO | WO 03/064767 A1 | 8/2003 |
| WO | WO 2004/072160 A1 | 8/2004 |

(Continued)

OTHER PUBLICATIONS

International Preliminary Report and Written Opinion for International Application No. PCT/SE2007/050922 dated Jun. 11, 2009.
Söderberg, Ö, Expandable microspheres in board, World Pulp & Paper Technology 1995/96, The International Review for the Pulp & Paper Industry, pp. 143-145.
Sears, Jr. G. W., "Determination of Specific Surface Area of Colloidal Silica by Titration with Sodium Hydroxide," Analytical Chemistry 28 (1956): 12, pp. 1981-1983.
Iler et al., "Degree of Hydration of Particles of Colloidal Silica in Aqueous Solution," J. Phys. Chem. 60 (1956), pp. 955-957.
English language translation of Early-Disclosure Patent Gazette of Japanese Patent No. 87-286534; early disclosure date Dec. 12, 1987.
English language translation of Japanese Laid-Open Patent No. JP 2689787.

(Continued)

Primary Examiner — Ling-Siu Choi
Assistant Examiner — Hui Chin
(74) Attorney, Agent, or Firm — Robert C. Morriss

(57) ABSTRACT

The invention relates to a cellulosic product containing thermoplastic microspheres and a charged aromatic acrylamide-based polymer. The invention further relates to a process for a process for producing a cellulosic product which comprises providing an aqueous suspension containing cellulosic fibers; adding to the suspension thermoplastic microspheres and a charged aromatic acrylamide-based polymer; and dewatering the obtained suspension. The invention also relates to the use of the cellulosic product as a liquid packaging board.

18 Claims, No Drawings

FOREIGN PATENT DOCUMENTS

| | | |
|---|---|---|
| WO | WO 2004/099499 A1 | 11/2004 |
| WO | WO 2004/113613 A1 | 12/2004 |
| WO | WO 2006/068573 A1 | 6/2006 |
| WO | WO 2006/068576 A1 | 6/2006 |
| WO | WO 2006068573 A1 * | 6/2006 |
| WO | WO 2006/123989 A2 | 11/2006 |

OTHER PUBLICATIONS

English language translation of Japanese Laid-Open Patent Gazette No. JP2002-254532A.

Patent Abstracts of Japan with an English language machine-generated translation of JP 2003-105693.

English language translation of Japanese Laid-Open Patent Gazette No. JP 2005-213379A.

English language translation of Japanese Laid-Open Patent Gazette No. JP 2005-272633A.

SPCI Proceedings, The World Pulp and Paper Week, Stockholm, Apr. 10-13, 1984, pp. 250-253; "EXPANCEL Expandable Microspheres in Paper and Board".

* cited by examiner

CELLULOSIC PRODUCT

This application is a national stage filing under 35 U.S.C. §371 of PCT/SE2007/050922, filed Nov. 29, 2007, which claims priority to European Patent Application No. 06125240.9, filed Dec. 1, 2006, U.S. Provisional Patent Application No. 60/872,346, filed on Dec. 1, 2006, European Patent Application No. 07108545.0, filed on May 21, 2007, and U.S. Provisional Patent Application No. 60/931,125, filed on May 21, 2007, the contents of which are incorporated herein by reference in their entirety.

FIELD OF THE INVENTION

The present invention relates to a cellulosic product containing thermoplastic microspheres and its production and use.

BACKGROUND OF THE INVENTION

Cellulosic products containing thermoplastic microspheres are known in the art, cf. U.S. Pat. Nos. 3,556,934; 4,133,688, and 5,125,996; US Patent Appl'n Publ. No 2003/0152724; JP Laid Open Nos. 2002-254532 and 2003-105693; JP Patent No. 2689787; International Patent Appl'n Publ. Nos. WO 2001/54988, 2004/099499; 2004/113613 and 2006/068573; and Ö. Söderberg, "World Pulp & Paper Technology 1995/96, "The International Review for the Pulp & Paper Industry" p. 143-145.

Thermoplastic microspheres may be incorporated in cellulosic products to provide low density, high bulk paper and paperboard articles, e.g. insulated containers such as, for example, paper cups which can be used for serving hot and cold beverages. It has however been experienced that the porosity of such cellulosic products can be too high, thereby lowering the resistance to penetration of gases and aqueous liquids, specifically the edge wick resistance to penetration of aqueous liquids for sized cellulosic products containing thermoplastic microspheres.

It would be advantageous to be able to provide cellulosic products containing thermoplastic microspheres which exhibit improved properties, in particular improved porosity and edge wick resistance.

SUMMARY OF THE INVENTION

The present invention relates to a cellulosic product containing thermoplastic microspheres and a charged aromatic acrylamide-based polymer.

The present invention further relates to a process for producing a cellulosic product which comprises
(i) providing an aqueous suspension containing cellulosic fibres;
(ii) adding to the suspension thermoplastic microspheres and a charged aromatic acrylamide-based polymer; and
(iii) dewatering the obtained suspension.

The present invention also relates to the use of a cellulosic product containing thermoplastic microspheres and a charged aromatic acrylamide-based polymer as a liquid packaging board.

DETAILED DESCRIPTION OF THE INVENTION

The incorporation of thermoplastic microspheres into cellulosic products generally increases the porosity, increases the bulk and lowers the density compared to cellulosic products not containing thermoplastic microspheres. According to the present invention it has been found that the porosity increase can be lower at corresponding bulk increase and the improved, lower porosity is obtained by means of cellulosic products containing thermoplastic microspheres and charged aromatic acrylamide-based polymer. In this context, improved porosity is an indication of increased resistance to penetration of gases and/or aqueous liquids, and improved edge wick resistance to penetration of aqueous liquids for sized cellulosic products containing thermoplastic microspheres. Hereby the present invention makes it possible to provide cellulosic products with improved properties.

The term "cellulosic products", as used herein, means all types of cellulosic products, including pulp bales and cellulosic products in sheet and web form, preferably paper and paperboard. The cellulosic product may comprise one or several plies or layers containing cellulosic fibers, including single and multi ply paper and paperboard products.

According to the invention, a cellulosic product is provided by a process which comprises adding thermoplastic microspheres and charged aromatic acrylamide-based polymer to an aqueous cellulosic suspension and then dewatering the obtained suspension to form the cellulosic product. In a preferred embodiment, the invention provides a single ply cellulosic product such as paper and paperboard comprising thermoplastic microspheres and charged aromatic acrylamide-based polymer which preferably are distributed throughout the cellulosic product, more preferably substantially uniformly distributed throughout the cellulosic product.

In another preferred embodiment, the invention provides a multi ply cellulosic product such as paper and paperboard comprising two or more plies or layers containing cellulosic fibers wherein at least one of said two or more plies or layers comprises thermoplastic microspheres and charged aromatic acrylamide-based polymer. Preferably, the thermoplastic microspheres and charged aromatic acrylamide-based polymer are distributed throughout at least one of said two or more plies, more preferably substantially uniformly distributed throughout at least one of said two or more plies. Multi ply cellulosic products according to the invention can be produced by forming at least one ply comprising cellulosic fibers, thermoplastic microspheres and charged aromatic acrylamide-based polymer and attaching said at least one ply to one or more plies comprising cellulosic fibers to form the multi ply cellulosic product. For example, a multi ply cellulosic product can be produced by forming the individual plies separately in one or several web-forming units and then couching them together in the wet state. Examples of suitable grades of multi ply cellulosic product of the invention include those comprising from three to seven plies or layers comprising cellulosic fibers and at least one of said cellulosic plies or layers comprising thermoplastic microspheres and charged aromatic acrylamide-based polymer. In multi ply cellulosic products with three or more plies, preferably at least one of the middle plies comprises thermoplastic microspheres and charged aromatic acrylamide-based polymer.

Cellulosic products according to the invention in sheet and web form, including single and multi ply products such as paper and paperboard, preferably have a grammage from about 50 to about 500 g/m$^2$, most preferably from about 100 to about 300 g/m$^2$.

The term "paperboard", as used herein, refers to various types of paperboard comprising cellulosic fibres including solid board, e.g. solid bleached sulphate board (SBS) and solid unbleached sulphate board (SUS); carton board, e.g. folding boxboard (FBB), folding carton board, liquid packaging board (LPB), including gable-top, aseptic, brick, non-aseptic packaging and retortable boards; white lined chipboard (WLC), unbleached kraftboard, grey chipboard and recycled board; liner board and container board, including white sulphate kraftliner, fully bleached kraftliner, testliner, white sulphate testliner, unbleached kraftliner, unbleached testliner and recycled liner; fluting and corrugated fluting. In a preferred embodiment of the invention, the cellulosic product is liquid packaging board.

According to the invention, the cellulosic product and suspension can contain different types of cellulosic fibers, and it preferably contains at least 25% and more preferably at least 50% by weight of such fibers, based on dry substance. The cellulosic product and suspension may be made from and contain cellulosic fibers of various kinds of pulps, such as bleached or unbleached pulps based on virgin and/or recycled fibres. The pulp may be based on fibres from chemical pulp such as sulphate, sulphite and organosolve pulps, mechanical pulp such as thermo-mechanical pulp (TMP), chemo-thermo-mechanical pulp (CTMP), refiner pulp and ground wood pulp, from both hardwood and softwood, and can also be based on recycled fibres, optionally from de-inked pulps (DIP), and mixtures thereof. The cellulosic product may also be made from fibers derived from one year plants like elephant grass, bagasse, flax, straw, etc. The cellulosic product may comprise one or several plies from the same or different kinds of pulps. Examples of multi ply combinations include bleached chemical pulp top/DIP, CTMP or mechanical pulp middle/bleached chemical pulp back; bleached chemical pulp top/DIP, CTMP or mechanical pulp middle/mechanical pulp back; bleached chemical pulp top/DIP, CTMP or mechanical pulp middle/unbleached chemical pulp back; and bleached chemical pulp top/unbleached chemical pulp back, the top side optionally being coated and the back side optionally being coated. The top side refers to the side intended to face the outside of the finished product or package.

According to the invention, the cellulosic product contains thermoplastic microspheres which can be expanded or unexpanded thermally expandable microspheres. The thermoplastic microspheres are preferably expanded and added to the cellulosic suspension, or stock, in the production process for the cellulosic product, either as pre-expanded microspheres or as unexpanded thermally expandable microspheres that preferably are expanded by heating in the production process of the cellulosic product, for example during a drying stage where heat is applied, or in a separate process step, for example in a cylinder heater or laminator. The microspheres may be expanded when the cellulosic product is still wet or when the cellulosic product is fully or almost fully dried. The microspheres are preferably added in the form of an aqueous slurry, which optionally may contain other additives desirable to supply to the cellulosic suspension.

The thermoplastic microspheres according to the invention preferably comprise a thermoplastic polymer shell encapsulating a propellant. The propellant is preferably a liquid having a boiling temperature not higher than the softening temperature of the thermoplastic polymer shell. Upon heating of thermally expandable thermoplastic microspheres, the propellant increases the internal pressure at the same time as the shell softens, resulting in significant expansion of the microspheres. Both expandable and pre-expanded thermoplastic microspheres are commercially available under the trademark Expancel® (Akzo Nobel) and are marketed in various forms, e.g. as dry free flowing particles, as aqueous slurries or as partially dewatered wet cakes. They are also well described in the literature, e.g. U.S. Pat. Nos. 3,615,972; 3,945,956; 4,287,308; 5,536,756; 6,235,800; 6,235,394 and 6,509,384; US Patent Appl'n Publ. No. 2005/0079352; EP Patent Nos. 486 080 and 1288272; International Patent Appl'n Publ. No. WO 2004/072160; and JP Laid Open Nos. 1987-286534; 2005-213379 and 2005-272633; which are hereby incorporated herein by reference.

The thermoplastic polymer shell of the thermoplastic microspheres is preferably made of a homo- or co-polymer obtained by polymerising ethylenically unsaturated monomers. Those monomers can be, for example, nitrile containing monomers such as acrylonitrile, methacrylonitrile, α-chloroacrylonitrile, α-ethoxyacrylonitrile, fumaronitrile or crotonitrile; acrylic esters such as methyl acrylate or ethyl acrylate; methacrylic esters such as methyl methacrylate, isobornyl methacrylate or ethyl methacrylate; vinyl halides such as vinyl chloride; vinyl esters such as vinyl acetate, vinyl ethers such as alkyl vinyl ethers like methyl vinyl ether or ethyl vinyl ether, other vinyl monomers such as vinyl pyridine; vinylidene halides such as vinylidene chloride; styrenes such as styrene, halogenated styrenes or α-methyl styrene; or dienes such as butadiene, isoprene and chloroprene. Any mixtures of the above mentioned monomers may also be used.

The propellant of the thermoplastic microspheres may comprise hydrocarbons such as propane, butane, isobutane, n-pentane, isopentane, neopentane, hexane, isohexane, neohexane, heptane, isoheptane, octane or isooctane, or mixtures thereof. Aside from them, other hydrocarbon types can also be used, such as petroleum ether, or chlorinated or fluorinated hydrocarbons, such as methyl chloride, methylene chloride, dichloroethane, dichloroethylene, trichloroethane, trichloroethylene, trichlorofluoromethane, perfluorinated hydrocarbons, etc.

Expandable thermoplastic microspheres suitable for the invention preferably have a volume median diameter from about 1 to about 500 μm, more preferably from about 5 to about 100 μm, most preferably from about 10 to about 50 μm. The temperature at which the expansion starts, referred to as $T_{start}$, is preferably from about 60 to about 150° C., most preferably from about 70 to about 100° C. The temperature at which maximum expansion is reached, referred to as $T_{max}$, is preferably from about 90 to about 180° C., most preferably from about 115 to about 150° C.

Pre-expanded thermoplastic microspheres suitable for the invention preferably have a volume median diameter from about 10 to about 120 μm, most preferably from about 20 to about 80 μm. The density is preferably from about 5 to about 150 g/dm³, most preferably from about 10 to about 100 g/dm³. Even though pre-expanded thermoplastic microspheres are commercially available as such, it is also possible to provide them by thermal on-site expansion of unexpanded expandable thermoplastic microspheres, for example just before they are added to the cellulosic suspension, which is facilitated if the expandable microspheres have a $T_{start}$ below about 100° C. so steam can be used as a heating medium.

In the production process for the cellulosic product, the charged aromatic acrylamide-based polymer according to the invention preferably functions as a retention, drainage and/or dry strength aid, optionally in combination with other additives to the cellulosic suspension such as siliceous materials, coagulants and other organic polymers. The terms "retention and drainage aid", as used herein, refer to one or more additives to the cellulosic suspension which provide improved retention and/or drainage in the production process for the cellulosic product. The terms "dry strength aid", as used herein, refer to one or more additives to the cellulosic suspension which imparts improved dry strength to the cellulosic product.

The charged aromatic acrylamide-based polymer according to the invention contains one or more charged, or ionic, groups of the same or different types. The one or more charged groups can be anionic, cationic or a combination of both anionic and cationic groups. In one embodiment of the invention, the polymer contains one or more cationic groups of the same or different types. Alternatively, or additionally, the polymer may contains one or more anionic groups of the same or different types. The charged aromatic acrylamide-based polymer can thus be selected from anionic, amphoteric and cationic organic polymers. Examples of suitable cationic groups include sulfonium and primary, secondary, tertiary and quaternary ammonium groups, preferably quaternary ammonium groups. Examples of suitable anionic groups include carboxylate, sulfonate, sulphate, phosphate and phosphonate groups.

The charged aromatic acrylamide-based polymer according to the invention comprises one or more aromatic groups of the same or different types. The aromatic groups can be present in the polymer backbone (main chain) or in a substituent group that is attached to the polymer backbone. Examples of suitable aromatic groups include aryl, aralkyl and alkaryl groups such as phenyl, phenylene, naphthyl, xylylene, benzyl and phenylethyl; nitrogen-containing aromatic (aryl) groups such as pyridinium and quinolinium; as well as derivatives of these groups such as benzyl.

The charged aromatic acrylamide-based polymer according to the invention comprises, in polymerized form, one or more polymerizable acrylamide-based monomers, i.e. acrylamide and/or substituted acrylamides, e.g. methacrylamide, N-alkyl(meth)acrylamides, N,N-dialkyl(meth)acrylamides, dialkylaminoalkyl(meth)acrylamides, N,N-methylene-bis(meth)acrylamide, N-vinyl(meth)acrylamide, and N-methylallyl(meth)acrylamide. Examples of suitable charged aromatic acrylamide-based polymers according to the invention include polymers obtained by polymerization of a monomer mixture comprising acrylamide or meth-acrylamide, i.e. (meth)acrylamide, preferably acrylamide. The monomer mixture may also contain one or more copolymerizable cationic, anionic and/or non-ionic monomers. According to a preferred embodiment, the monomer mixture contains one or more charged aromatic monomers which can be cationic and/or anionic. Alternatively, or additionally, the monomer mixture contains anionic and/or cationic monomers and non-ionic aromatic monomer.

Examples of suitable cationic aromatic monomers include the monomers represented by the general structural formula (I):

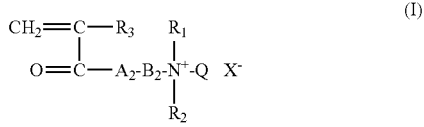

wherein $R_3$ is H or $CH_3$; $R_1$ and $R_2$ are each H or, preferably, a hydrocarbon group, suitably alkyl, having from 1 to 3 carbon atoms, preferably 1 to 2 carbon atoms; $A_2$ is O or NH; $B_2$ is an alkyl or alkylene group having from 2 to 8 carbon atoms, suitably from 2 to 4 carbon atoms, or a hydroxy propylene group; Q is a substituent containing an aromatic group, suitably a phenyl or substituted phenyl group, which can be attached to the nitrogen by means of an alkylene group usually having from 1 to 3 carbon atoms, suitably 1 to 2 carbon atoms, and preferably Q is a benzyl group (—$CH_2$—$C_6H_5$); and $X^-$ is an anionic counterion, usually a halide like chloride. Examples of suitable monomers represented by the general formula (I) include dimethylaminoethyl acrylate benzyl chloride quaternary salt and dimethylaminoethyl methacrylate benzyl chloride quaternary salt. Examples of further suitable copolymerizable cationic monomers include acid addition salts and quaternary salts of dimethylaminoethyl(meth)acrylate and diallyldimethylammonium chloride, and triallyl ammonium salts.

Examples of anionic monomers include monomers that are rendered anionic in an aqueous solution. Examples of suitable anionic aromatic monomers include styrene sulphonates and salts thereof, including salts of sodium and other alkali metals. Examples of further suitable copolymerizable anionic monomers include acrylic acid, methacrylic acid, ethyl acrylic acid, crotonic acid, itaconic acid and maleic acid and salts thereof, preferably salts thereof, including salts of sodium and other alkali metals.

Examples of suitable non-ionic aromatic monomers include styrene, substituted styrenes and divinyl benzene. Examples of further suitable copolymerizable non-ionic monomers include acrylate-based monomers like dialkylaminoalkyl(meth)acrylates, polyethyleneglycol di(meth)acrylate, glycidyl(meth)acrylate and vinylamides.

Examples of preferred charged aromatic acrylamide-based polymers according to the invention include cationic and amphoteric cationic polymers obtained by polymerization of a cationic aromatic monomer or monomer mixture comprising (meth)acrylamide and a cationic aromatic monomer represented by the general structural formula (I), optionally in combination with anionic monomer. Other examples include anionic and amphoteric polymers obtained by polymerization of a monomer mixture comprising (meth)acrylamide and anionic aromatic monomer like styrene sulphonates and salts thereof, optionally in combination with cationic monomer.

Charged aromatic acrylamide-based polymers according to the invention can be prepared from a monomer mixture generally comprising from 1 to 99 mole %, suitably from 2 to 50 mole % and preferably from 5 to 20 mole % of monomer having an aromatic group, e.g. monomer having aromatic and cationic or anionic groups, or monomer having an aromatic group and monomer having a cationic or anionic group, respectively, and from 99 to 1 mole %, suitably from 98 to 50 mole %, and preferably from 95 to 80 mole % of other copolymerizable monomers which preferably comprises acrylamide or methacrylamide ((meth)acrylamide), the monomer mixture suitably comprising from 98 to 50 mole % and preferably from 95 to 80 mole % of (meth)acrylamide, the sum of percentages being 100.

The charged aromatic acrylamide-based polymer according to the invention can be linear, branched or cross-linked. The aromatic acrylamide-based polymer is suitably water soluble or water swellable, preferably water soluble, and it is preferably added to the cellulosic suspension in the form of an aqueous solution or dispersion thereof.

Charged aromatic acrylamide-based polymers according to the invention can have a charge density from about 0.5 to about 10 meq/g, and preferably from about 1 to about 8 meq/g. Examples of aromatic polymers that can be used according to the invention include those disclosed in WO 2002/12626, 2003/064767, 2006/068576 and 2006/123989, which are hereby incorporated herein by reference.

Usually, the charged aromatic acrylamide-based polymer has a weight average molecular weight of at least about 50,000 or at least about 100,000, suitably at least about 500,000 or at least about 1,000,000. In most cases, it is preferred that the weight average molecular weight is no more than about 50 millions, notably no more than about 10 millions or about 5 millions.

Examples of suitable siliceous materials include anionic silica-based particles and anionic clays of the smectite type. Preferably, the siliceous material has particles in the colloidal range of particle size. Anionic silica-based particles, i.e. particles based on $SiO_2$ or silicic acid, are preferably used and such particles are usually supplied in the form of aqueous colloidal dispersions, so-called sols. Examples of suitable silica-based particles include colloidal silica and different types of polysilicic acid, either homopolymerised or co-polymerised. The silica-based sols can be modified and contain other elements, e.g. aluminium, boron, nitrogen, zirconium, gallium, titatnium and the like, which can be present in the aqueous phase and/or in the silica-based particles. Examples of suitable silica-based particles of this type include colloidal aluminium-modified silica and aluminium silicates. Mixtures of such suitable silica-based particles can also be used. Examples of suitable drainage and retention aids comprising anionic silica-based particles include those disclosed in U.S. Pat. Nos. 4,388,150; 4,927,498; 4,954,220; 4,961,825; 4,980,025; 5,127,994; 5,176,891; 5,368,833; 5,447,604; 5,470,435; 5,543,014; 5,571,494; 5,573,674; 5,584,966; 5,603,805; 5,688,482; and 5,707,493; which are hereby incorporated herein by reference.

Examples of suitable anionic silica-based particles include those having an average particle size below about 100 nm, preferably below about 20 nm and more preferably in the range of from about 1 to about 10 nm. As conventional in the silica chemistry, the particle size refers to the average size of the primary particles, which may be aggregated or non-aggregated. The specific surface area of the silica-based particles is suitably above 50 $m^2/g$ and preferably above 100 $m^2/g$. Generally, the specific surface area can be up to about 1700 $m^2/g$ and preferably up to 1000 $m^2/g$. The specific surface area is measured by means of titration with NaOH in a well known manner, e.g. as described by G. W. Sears in Analytical Chemistry 28(1956): 12, 1981-1983 and in the U.S. Pat. No. 5,176,891. The given area thus represents the average specific surface area of the particles.

Preferably, the anionic silica-based particles have specific surface area within the range of from 50 to 1000 $m^2/g$, more preferably from 100 to 950 $m^2/g$. Sols of silica-based particles of these types also encompass modifications, for example with any of the elements mentioned above. Preferably, the silica-based particles are present in a sol having a S-value in the range of from 8 to 50%, preferably from 10 to 40%, containing silica-based particles with a specific surface area in the range of from 300 to 1000 $m^2/g$, suitably from 500 to 950 $m^2/g$, and preferably from 750 to 950 $m^2/g$, which sols can be modified as mentioned above. The S-value can be measured and calculated as described by Iler & Dalton in J. Phys. Chem. 60(1956), 955-957. The S-value indicates the degree of aggregation or microgel formation and a lower S-value is indicative of a higher degree of aggregation.

In yet another preferred embodiment of the invention, the silica-based particles are selected from polysilicic acid, either homopolymerised or co-polymerised, having a high specific surface area, suitably above about 1000 $m^2/g$. The specific surface area can be within the range of from 1000 to 1700 $m^2/g$ and preferably from 1050 to 1600 $m^2/g$. The sols of modified or co-polymerised polysilicic acid can contain other elements as mentioned above. In the art, poly-silicic acid is also referred to as polymeric silicic acid, polysilicic acid microgel, polysilicate and polysilicate microgel, which all are encompassed by the term polysilicic acid used herein. Aluminium-containing compounds of this type are commonly also referred to as polyalumino silicate and polyalumino silicate microgel, which are both, encompassed by the terms colloidal aluminium-modified silica and aluminium silicate used herein.

Examples of suitable anionic clays of the smectite type include montmorillonite/bentonite, hectorite, beidelite, nontronite, saponite, laponite, preferably bentonite. Examples of suitable anionic bentonite clays include those disclosed in U.S. Pat. Nos. 4,753,710; 5,071,512; and 5,607,552, which are hereby incorporated herein by reference.

Examples of suitable cationic coagulants (also referred to as trash catchers and fixatives) include water-soluble organic polymeric coagulants and inorganic coagulants. The cationic coagulants can be used singly or together, i.e. a polymeric coagulant can be used in combination with an inorganic coagulant. Examples of suitable water-soluble organic polymeric cationic coagulants include cationic polyamines, polyamideamines, polyethylene imines, dicyandiamide condensation polymers and polymers of water soluble ethylenically unsaturated monomer or monomer blend which is formed of 50 to 100 mole % cationic monomer and 0 to 50 mole % other monomer. The amount of cationic monomer is usually at least 80 mole %, suitably 100%. Examples of suitable ethylenically unsaturated cationic monomers include dialkylaminoalkyl(meth)-acrylates and -acrylamides, preferably in quaternised form, and diallyl dialkyl ammonium chlorides, e.g. diallyl dimethyl ammonium chloride (DADMAC), preferably homopolymers and copolymers of DADMAC. The organic polymeric cationic coagulants usually have a weight average molecular weight in the range of from 1,000 to 700,000, suitably from 10,000 to 500,000. Examples of suitable inorganic coagulants include aluminium compounds, e.g. alum and polyaluminium compounds, e.g. polyaluminium chlorides, polyaluminium sulphates, polyaluminium silicate sulphates and mixtures thereof.

Examples of other organic polymers that can be used as drainage and retention aids include polymers of the above-mentioned types except that one or more aromatic groups not have to be present in the polymers. Examples of suitable organic polymers of this type include anionic, amphoteric and cationic polysaccharides such as guar gums and starches; anionic, amphoteric and cationic vinyl addition polymers such as acrylamide-based polymers, e.g. essentially linear, branched and cross-linked anionic and cationic acrylamide-based polymers, preferably cationic starch and cationic and anionic polyacrylamide.

According to the invention, the cellulosic product is preferably sized with a hydrophobic sizing agent that is added to the stock before dewatering and/or applied to the surface of the cellulosic product, preferably at least stock sized. In multi ply cellulosic products, one or more plies containing thermoplastic microspheres and aromatic polymer are preferably sized. Sized cellulosic products according to the invention show increased resistance to penetration of aqueous liquids, notably increased edge wick resistance. Preferred sizing agents include cellulose reactive sizes such as ketene dimers or multimers like alkyl or alkenyl ketene dimers (AKD), succinic anhydrides like alkyl or alkenyl succinic anhydrides (ASA), and mixtures thereof. Other useful sizing agents include cellulose non-reactive sizes such as rosin, starch and other polymeric sizes like copolymers of styrene with vinyl monomers such as maleic anhydride, acrylic acid and its alkyl esters, acrylamide, etc. The same or different sizing agent may be used for different plies in the cellulosic product. For example, it is possible to use AKD or ASA in one or more plies and rosin in one or more other plies.

Preferred ketene dimers have the general formula (II):

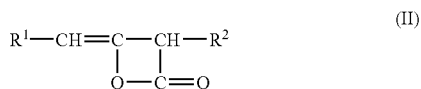

where $R^1$ and $R^2$ represent the same or different saturated or unsaturated hydrocarbon groups such as alkyl, alkenyl, cycloalkyl, aryl or aralkyl. The hydrocarbon groups may be branched or straight chain and preferably have from 6 to 36 carbon atoms, most preferably from 12 to 20 carbon atoms. Examples of hydrocarbon groups include branched and straight chained octyl, decyl, dodecyl, tetradecyl, hexadecyl, octadecyl, eicosyl, docosyl, tetracosyl, phenyl, benzyl, beta-naphthyl, cyclohexyl and hexadecyl groups. Depending on the hydrocarbon groups, the ketene dimers may be solid or liquid at room temperature (25° C.). Examples of suitable sizing agents and formulations thereof include those disclosed in U.S. Pat. Nos. 5,969,011; 6,165,259; 6,306,255 and 6,846,384.

According to the invention, the cellulosic product preferably comprises a wet strength agent that is added to the stock before dewatering. Suitable wet strength agents include resins of polyamine epihalohydrin, polyamide epihalohydrin, polyaminoamide epihalohydrin, urea formaldehyde, urea melamine/formaldehyde, phenol formaldehyde, polyacrylic amide glyoxal condensate, polyvinyl amine, polyurethane, polyisocyanate, and mixtures thereof, of which polyaminoamide epichlorohydrin is particularly preferred.

It is particularly preferred that at least one of a sizing agent, preferably a ketene dimer, and a wet strength agent, preferably polyaminoamide epihalohydrin, is added to the stock when producing the paper or paper board.

The cellulosic product may also contain other additives commonly used in paper making and added to the cellulosic suspension before dewatering. Such additives may include one or more fillers, e.g. mineral fillers like kaolin, china clay, titanium dioxide, gypsum, talc, chalk, ground marble, ground calcium carbonate and precipitated calcium carbonate. Other commonly used additives may include dyes, optical brightening agents, etc.

According to the invention, the cellulosic product, e.g. single and multi ply paper and paperboard grades, can be subjected to further process steps. Examples of suitable process steps include coating, e.g. starch coating and pigment coating, printing and cutting. Accordingly, examples of suitable cellulosic product of the invention include coated paperboard, e.g. starch and/or pigment coated, and printed paperboard.

The thermoplastic microspheres, charged aromatic acrylamide-based polymer and optional other additives such as siliceous materials, coagulants, other organic polymers, sizing agents and wet strength agents, can be added to the cellulosic suspension in conventional manner and in any order. It is preferred to add the thermoplastic microspheres to the cellulosic suspension, preferably prior to adding the charged aromatic acrylamide-based polymer, even if opposite order or addition may also be used, and preferably prior to adding siliceous materials, sizing agents and wet strength agents, if used. When using a siliceous material, it is preferred to add the charged aromatic acrylamide-based polymer to the suspension prior to or simultaneously with adding the siliceous material. It is further preferred to add a cationic polymer before a shear stage, which can be selected from pumping, mixing, cleaning, etc., and to add the siliceous material after that shear stage. When using a cationic coagulant, it is preferably introduced in the cellulosic suspension early in the process, preferably prior to introducing charged aromatic acrylamide-based polymer and siliceous material, if used. When using a sizing agent, it is preferably introduced in the cellulosic suspension early in the process, for example before or after adding the thermoplastic microspheres. When using a wet strength agent, it is preferably introduced in the cellulosic suspension early in the process, usually before adding the sizing agent, and either before or after adding the thermoplastic microspheres.

According to the invention, the thermoplastic microspheres, charged aromatic acrylamide-based polymer and optional other additives can be added to the cellulosic suspension and present in the cellulosic product in amounts which can vary within wide limits depending on, inter alia, type and number of additives, type of cellulosic suspension, filler content, type of filler, point of addition, etc. The amount of thermoplastic microspheres is suitably from about 1 to about 100, preferably from about 1 to about 50 and most preferably from about 4 to about 40 kg/tonne of dry cellulosic suspension or product. The amount of charged aromatic acrylamide-based polymer is suitably from about 0.01 to about 30 and preferably from about 0.1 to about 5 kg/tonne of dry cellulosic suspension or product. If used, the amount of siliceous material is suitably from about 0.01 to about 10 and preferably from about 0.1 to about 5 kg/tonne of dry cellulosic suspension or product. If used, the amount of cationic coagulant is suitably from about 0.01 to about 30 and preferably from about 1 to about 20 kg/tonne of dry cellulosic suspension or product. If used, the amount of other organic polymer is suitably from about 0.01 to about 30 and preferably from about 0.1 to about 5 kg/tonne of dry cellulosic suspension or product. If used, the amount of sizing agent is suitably from about 0.1 to about 10 and preferably from about 0.3 to about 5 kg/tonne of dry cellulosic suspension or product. If used, the amount of wet strength agent is preferably from about 0.1 to about 10 and preferably from about 0.5 to about 5 kg/tonne of dry cellulosic suspension or product.

The invention is further illustrated in the following example which, however, is not intended to limit the same. Parts and % relate to parts by weight and % by weight, respectively, unless otherwise stated.

Example 1

The following products were used in the Examples:
MS 1: Unexpanded microspheres with an average particle size of 16-24 µm (Expancel™ 820SL80).
MS 2: Unexpanded microspheres with an average particle size of 6-9 µm (Expancel™ 461WU20).
MS 3: Partially pre-expanded microspheres an average particle size of 20-30 µm (Expancel™ 461WE20).
PL 1: Cationic acrylamide-based polymer prepared by polymerisation of acrylamide (90 mole %) and acryloxyethyltrimethyl ammonium chloride (10 mole %), the polymer having a weight average molecular weight of about 6 million and cationic charge of about 1.2 meq/g.
PL 2: Cationic acrylamide-based polymer prepared by polymerisation of acrylamide (90 mole %) and acryloxyethyldimethyl benzyl ammonium chloride (10 mole %), the polymer having a weight average molecular weight of about 6 million and cationic charge of about 1.2 meq/g.
PL 3: Cationic acrylamide-based polymer prepared by polymerisation of acrylamide (90 mole %) and acryloxyethyltrimethyl ammonium chloride (10 mole %), the polymer having a weight average molecular weight of about 1 million and cationic charge of about 1.2 meq/g.

PL 4: Cationic acrylamide-based polymer prepared by polymerisation of acrylamide (90 mole %) and acryloxyethyldimethyl benzyl ammonium chloride (10 mole %), the polymer having a weight average molecular weight of about 1 million and cationic charge of about 1.2 meq/g.

NP 1: Anionic inorganic condensation polymer of silicic acid in the form of colloidal aluminium-modified silica sol having an S value of <35 and containing silica-based particles with a specific surface area of about 700 m²/g.

ST 1: Cationic starch based biopolymer modified with 2,3-hydroxypropyl trimethyl ammonium chloride to D.S. 0.042, the polymer having a cationic charge density of about 0.28 meq/g.

SA 1: AKD sizing agent, stabilized with PL 3

Example 2

The centre layer of liquid packaging board was produced in a PFI sheet former, with a grammage of approximately 200 gsm. The stock used in the test was based on 100% bleached softwood kraft fibers. Stock consistency was 1.8%. Conductivity was 0.2 mS/cm.

Additions to the stock were made at the following times (in seconds)

0 s, Expancel™ microspheres, MS 1

15 s, Cationic polymer, PL 30 s, Anionic silica sol, NP 1

45 s, Dewatering

The board sheets were pressed and dried. In order to cause the microspheres, MS, to expand, a cylinder dryer at 125° C. was used.

Porosity was measured by Bendtsen Porosity Tester Model 5, supplied by Andersen & Sörensen, Denmark. The unit for this porosity tester is [ml/min] of air. Bulk, measured in the unit [cm³/kg], was calculated by dividing the thickness [μm] with the grammage [g/m²]. The thickness was measured with L&W Tester Type 5102, supplied by Lorentzen & Wettre, Sweden, and the grammage was measured by using a standard scale to give the weight [g], at a given area [m²] for the paper or board sample.

Table 1 shows the results of the porosity and bulk measurements at different addition levels, calculated as dry product on dry stock system, except for the silica-based particles which were calculated as $SiO_2$ and based on dry stock system.

Test Nos. 1 to 5 illustrate processes employing additives used for comparison (Ref.) and Test Nos. 6 to 8 illustrate processes according to the invention.

TABLE 1

| Test No. | Expancel™ Microsphere MS 1 (kg/t) | Polymer type | Polymer (kg/t) | Nano-particle NP 1 (kg/t) | Bulk (cm³/g) | Porosity (ml/min) |
|---|---|---|---|---|---|---|
| 1 | — | — | — | — | 2.1 | 328 |
| 2 | — | — | — | 0.5 | 2.2 | 385 |
| 3 | 10 | PL 1 | 0.5 | 0.5 | 2.4 | 558 |
| 4 | 20 | PL 1 | 0.5 | 0.5 | 2.7 | 742 |
| 5 | 40 | PL 3 | 2 | 2 | 3.1 | 1010 |
| 6 | 10 | PL 2 | 0.5 | 0.5 | 2.4 | 532 |
| 7 | 20 | PL 2 | 0.5 | 0.5 | 2.7 | 703 |
| 8 | 40 | PL 4 | 2 | 2 | 3.1 | 933 |

As can be seen from Table 1, by using PL 2 and PL 4 according to the present invention, the bulk was increased at a relatively low porosity compared to when using PL 1 and PL 3.

Example 3

The centre layer of liquid packaging board was produced in a PFI sheet former, according to the general method of Example 2 except that the conductivity was adjusted to 3.0 mS/cm by addition of CaCl2.

Table 2 shows the results in which Test Nos. 1 to 2 illustrate processes employing additives used for comparison (Ref.) and Test Nos. 3 illustrates a process according to the invention.

TABLE 2

| Test No. | Expancel™ Microsphere MS 1 (kg/t) | Polymer type | Polymer (kg/t) | Nano-particle NP 1 (kg/t) | Bulk (cm³/g) | Porosity (ml/min) |
|---|---|---|---|---|---|---|
| 1 | — | — | — | — | 2.2 | 337 |
| 2 | 20 | PL 3 | 2 | 0.5 | 2.6 | 718 |
| 3 | 20 | PL 4 | 2 | 0.5 | 2.6 | 668 |

As can be seen from Table 2, the present invention provided a cellulosic product with improved (lower) porosity.

Example 4

The centre layer of liquid packaging board was produced in an experimental paper machine (XPM) with a grammage of approximately 120 gsm. The stock used in the test was based on 100% unbleached chemical thermomechanical pulp (CTMP). The pH was 8.0.

Additions to the stock were made in the following order:

Cationic starch 1, ST 1, 50%

Expancel™ microspheres, MS

Cationic starch 2, ST 1, 50%

AKD sizing agent, SA 1

Cationic polymer, PL

Anionic silica sol, NP 1

The paper web samples were already dried when leaving the XPM (maximum drying temperature 100° C.). The microspheres were expanded at 140° C. in a cylinder dryer.

Table 3 shows the results in which Test Nos. 1 to 2 illustrate processes employing additives used for comparison (Ref.) and Test Nos. 3-4 illustrate processes according to the invention.

TABLE 3

| Test No. | Cationic starch ST 1 (kg/t) | Sizing agent SA 1 (kg/t) | Expancel ™ microsphere (kg/t)/Type | Polymer (kg/t)/Type | Nano-particle NP 1 (kg/t) | Bulk (cm³/g) | Porosity (ml/min) |
|---|---|---|---|---|---|---|---|
| 1 | 3 + 3 | 2 | 40/MS 2 | 0.15/1 | 3 | 3.0 | 2458 |
| 2 | 3 + 3 | 2 | 40/MS 3 | 0.15/1 | 3 | 4.1 | 2625 |
| 3 | 3 + 3 | 2 | 40/MS 2 | 0.15/2 | 3 | 3.0 | 2417 |
| 4 | 3 + 3 | 2 | 40/MS 3 | 0.15/2 | 3 | 4.1 | 2617 |

As can be seen from Table 3, the present invention provided a cellulosic product with improved (lower) porosity.

The invention claimed is:

1. Cellulosic product containing pre-expanded thermoplastic microspheres and a charged aromatic acrylamide-based polymer.

2. The cellulosic product according to claim 1, wherein the charged aromatic acrylamide-based polymer is water soluble.

3. The cellulosic product according to claim 1, wherein the charged aromatic acrylamide-based polymer is cationic.

4. The cellulosic product according to claim 1, wherein the charged aromatic acrylamide-based polymer is amphoteric.

5. The cellulosic product according to claim 1, wherein the charged aromatic acrylamide-based polymer contains quaternary ammonium groups.

6. The cellulosic product according to claim 1, wherein the charged aromatic acrylamide-based polymer is obtained by polymerizing a cationic aromatic monomer or a monomer mixture comprising a cationic aromatic monomer represented by the general structural formula (I):

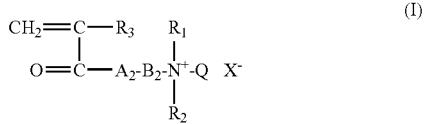

wherein $R_3$ is H or $CH_3$; $R_1$ and $R_2$ are each H or an alkyl group having from 1 to 3 carbon atoms; $A_2$ is O or NH; $B_2$ is an alkyl or alkylene group having from 2 to 8 carbon atoms, or a hydroxy propylene group; Q is a benzyl group; and $X^-$ is an anionic counterion.

7. The cellulosic product according to claim 1, wherein the charged aromatic acrylamide-based polymer is anionic.

8. The cellulosic product according to claim 1, wherein the charged aromatic acrylamide-based polymer has a weight average molecular weight above 500,000.

9. The cellulosic product according to claim 1, wherein the cellulosic product is paper or paperboard.

10. The cellulosic product according to claim 1, wherein a sizing agent is further present in the cellulosic product.

11. The cellulosic product according to claim 1, wherein a siliceous material is further present in the cellulosic product.

12. The cellulosic product according to claim 1, wherein a wet strength agent is further present in the cellulosic product.

13. The cellulosic product according to claim 1, wherein the cellulosic product is a multi ply paperboard.

14. The cellulosic product according to claim 1, wherein the cellulosic product contains at least 50% by weight of cellulosic fibers, based on dry substance.

15. Cellulosic product containing pre-expanded thermoplastic microspheres and a cationic aromatic acrylamide-based polymer, wherein the cellulosic product is paper board having a grammage from about 100 to about 300 g/m².

16. The cellulosic product according to claim 15, wherein a sizing agent is further present in the cellulosic product.

17. The cellulosic product according to claim 15, wherein a wet strength agent is further present in the cellulosic product.

18. The cellulosic product according to claim 15 which is a multi ply cellulosic product comprising two or more plies containing cellulosic fibers wherein at least one of said two or more plies comprises thermoplastic microspheres and cationic aromatic acrylamide-based polymer.

* * * * *